United States Patent
Freiseisen et al.

(10) Patent No.: US 6,663,111 B1
(45) Date of Patent: Dec. 16, 2003

(54) SEALING UNIT

(76) Inventors: Christian Freiseisen, Breslauer Weg 10, D-82538 Geretsried (DE); Thomas Freiseisen, Liszt-Weg 10, D-82538 Geretsried (DE)

( * ) Notice: Subject to any disclaimer, the term of this patent is extended or adjusted under 35 U.S.C. 154(b) by 35 days.

(21) Appl. No.: 10/129,967

(22) PCT Filed: Nov. 22, 2000

(86) PCT No.: PCT/EP00/11642

§ 371 (c)(1),
(2), (4) Date: May 22, 2002

(87) PCT Pub. No.: WO01/38776

PCT Pub. Date: May 31, 2001

(30) Foreign Application Priority Data

Nov. 22, 1999 (DE) .......................... 199 56 084

(51) Int. Cl.$^7$ ............................... F16L 21/02
(52) U.S. Cl. ............................. 277/602; 285/8; 285/110
(58) Field of Search ............................. 277/602, 603, 277/604, 626, 627, 632, 644; 285/390, 110, 200, 8, 345, 374

(56) References Cited

U.S. PATENT DOCUMENTS

| | | | |
|---|---|---|---|
| 3,633,944 A | * | 1/1972 | Hamburg ..................... 285/81 |
| 4,146,254 A | * | 3/1979 | Turner et al. ................. 285/105 |
| 5,284,582 A | * | 2/1994 | Yang ........................ 210/232 |
| 6,367,802 B1 | * | 4/2002 | Knapp ........................ 277/314 |

FOREIGN PATENT DOCUMENTS

| | | |
|---|---|---|
| DE | 299 07 097 U1 | 2/2000 |
| DE | 198 35 624 C1 | 5/2000 |
| WO | 92/02311 A1 | 2/1992 |

* cited by examiner

*Primary Examiner*—Robert J. Sandy
*Assistant Examiner*—Dinesh Melwani
(74) *Attorney, Agent, or Firm*—Bacon & Thomas, PLLC

(57) ABSTRACT

Provided is a sealing unit for sliding onto a water outlet (38) with formation of a fluid-tight connection with a water hose or similar that is equipped with said sealing unit (1), and that comprises at least one outer sealing ring (3) consisting of an elastic material and having an annular base body (4), from the area (5) of which that is oriented towards the center, a circumferential outer sealing collar (6) extends towards the center, which collar is moreover inclined in the insertion direction (17) and encloses an opening (16) through which the water outlet (38) can be inserted, and a sliding funnel (8) comprising an annular circumferential base body (9) resting upon the exterior of the base body (4) of the sealing ring (3), and from which several lobe-type tongues (11) articulated to the base body (9) by means of their bases (10), extend radially inwards, which tongues rest upon the exterior of the outer sealing collar (6) and form a kind of funnel together, and the free ends of which enclose the opening (16) for the insertion of the water outlet (38). Said inventive sealing unit is characterized in that the tongues (11), on their free ends (12) have a thickened portion (13) provided with a supporting surface (14), which is arranged approximately perpendicular to the plane of the respective tongue (11) and which is arranged approximately perpendicular to the radial longitudinal direction of the respective tongue (11), and the outer sealing collar (6) passes over radially inwards into a prolongation (18), which extends towards the center beyond the free ends of the tongues (11) of the sliding funnel (8), and which is configured on its free edge as a torus (41). Thus, an improved sealing effect between the water outlet and the sealing unit is achieved.

8 Claims, 3 Drawing Sheets

SEALING UNIT

BACKGROUND OF THE INVENTION

The invention relates to a sealing unit for sliding onto a water outlet with formation of a fluid-tight connection with a water hose or similar that is equipped with said sealing unit and that comprises at least one outer sealing ring consisting of an elastic material and having an annular base body, from the area of which that is oriented towards the center, a circumferential outer sealing collar extends towards the center, which collar is moreover inclined in the insertion direction and encloses an opening through which the water outlet can be inserted, and a sliding funnel comprising an annular circumferential base body resting upon the exterior of the base body of the sealing ring, and from which several lobe-type tongues articulated to the base body by means of their bases, extend radially inwards, which tongues rest upon the exterior of the outer sealing collar and form a kind of funnel together, and the free ends of which enclose the opening for the insertion of the water outlet.

A generic sealing unit has already been described in International Application PCT/EP 99/05680, which is not an earlier publication. Moreover, sealing units comprising the sealing collars of interest here, are described in German Patent Application 19835624.5, as well as in German Utility Model 29907097.2.

Normally, it is not possible to connect a hose without further measures with a water outlet of a water source, e.g. a water tap, in such a manner that the connection resists the water pressure and allows as little water as possible to exit to the outside at the joint.

In the above-mentioned publications, an adapter coupling is described provided with a sealing unit, which enables a water-conducting and as tight as possible connection to be established between a water tap or the like and a hose, whereby the water tap can have any desired shape and/or cross-section.

Upon slipping this known adapter coupling onto a water outlet, the sealing collar made of an elastic material expands, and then adapts to the outer contour of the water outlet. The sealing function at this point between the sealing collar and the water outlet, however, is not yet satisfactory, in particular when high pressures are applied.

It is therefore the task of the present invention to provide a sealing unit having an improved sealing function, in particular with high pressures.

SUMMARY OF THE INVENTION

The inventive sealing unit has a sliding funnel comprising an annular circumferential base body. The inventive sealing unit moreover has a sealing ring made of an elastic material and having an annular base body, from the interior area of which a circumferential outer sealing collar extends towards the center. The sliding funnel has an annular circumferential base body resting on the exterior of the base body of the sealing ring. The term "exterior" thereby designates that direction that points towards the water outlet or water tap to be inserted into the sealing unit. From the base body, several lobe-type tongues arranged side-by-side, tapering radially inwards, being approximately of the same configuration, and being articulated to the base body by means of their bases, extend radially inwards, which tongues likewise rest upon the exterior of the outer sealing collar. Thus, they are inclined approximately angular to the entry direction and form a kind of funnel. Their free ends are located approximately on a circle that forms the opening into which the water outlet will be inserted. This sliding funnel appropriately consists of a plastic material as smooth as possible, as well as non-elastic, such as polypropylene (PP) or PVC.

The lobes of said sliding funnel hence are flat, thin and plate-like entities, respectively.

One of the essential features of the present invention resides in that these tongues exhibit at their free ends a thickened portion provided with a supporting surface that is arranged approximately perpendicular to the plane of the tongue and approximately perpendicular to the longitudinal direction of the tongue. The function of this thickened portion will be described hereafter.

Whereas the sliding funnel is comprised of a rather non-elastic material, the sealing ring is made of an elastic material such as rubber. The sealing ring features an annular continuous and circumferential base body. From the interior area, a continuous circumferential outer sealing collar extends towards the center. Said sealing collar, in the inoperative state, is inclined angular to the insertion direction and encloses with its free inner edge the opening into which the water outlet will be inserted.

A further important inventive feature resides in that the outer sealing collar passes over radially inwards into a prolongation that extends towards the center beyond the free ends of the tongues of the sliding funnel. This prolongation is configured as a torus at its free edge. The prolongation can pivot with its torus about the connection point between the sealing collar and the prolongation with the inventive sealing unit being used accordingly, and hence can pivot about that connection point, which can also be designated as a predetermined bending point, upon being acted upon with pressure by a fluid, and thereby comes into abutment against the supporting surface. The torus that therewith is thicker than the sealing collar, as well as the prolongation in the area of the connection point, is thereby supported by the free ends of the tongues, and consequently improves the sealing effect between the water outlet (to be more precise, the envelope thereof) and the sealing unit, as will hereafter be described in more detail.

The inventive sealing unit can be inserted in an adapter coupling that is described in the initially mentioned publications. The sealing unit, however, can also be inserted in other tubular structures or such like, and can serve the purpose of connecting the most diverse water outlets, for example, with a pipe, a hose, etc.

Due to the interaction of the thickened portion at the lobe ends with the torus, the sealing action is improved when a pressure is applied with a fluid under pressure, since, due to the pressurized fluid, the sealing torus is pressed between the thickened portion of the sliding funnel and the outer envelope of the inserted water outlet, etc., which will be discussed hereafter in more detail.

According to a preferred embodiment, the ring cross-section of the torus is configured approximately semicircular, the bulged side pointing radially outwards and hence towards the water outlet to be inserted. The prolongation then is joined at its radial outer edge with the sealing collar. In other words, the transition zone from the sealing collar to the prolongation constitutes the connection point or predetermined bending point. Thus, even more material is pressed into the area between the lobe ends of the slide funnel and the outer envelope of the water outlet. The outer sealing collar and the prolongation thereby are preferably configured one-piece and consist of the same elastic material.

The sealing effect is further supported by an O-ring-shaped thickened portion situated approximately in that area, which, in the inoperative state, is in the center of the sealing collar, or is closest to the center of the sealing collar. This O-ring-shaped thickened portion, alike the sealing collar and the prolongation, respectively, is also comprised of an elastic material, which, however, is harder than the material of the associated sealing collar and the associated prolongation.

Preferably, the sealing collar features a layer on its side oriented towards the sliding funnel and therewith on its outer side, which layer extends up to the O-ring-shaped thickened portion and is comprised of the same material as the O-ring-shaped thickened portion. This layer facilitates the relative displacement of the sliding funnel and the sealing collar during the introduction of the water outlet.

The elastic material of the O-ring-shaped thickened portion and the mentioned layer can, for example, have a Shore A hardness of 60–80, and can be a silicone rubber, whereas the material of the sealing ring or sealing collar can have a Shore A hardness of 20–30, and can likewise be a silicone rubber or a natural rubber.

At the side of the outer sealing ring opposing the sliding funnel, preferably a further inner sealing ring is disposed having an inner sealing collar configured approximately alike the outer sealing collar and extending towards the center up to the connection area where the outer sealing collar passes over into the prolongation. Preferably, the inner sealing collar, in the connection area, is connected with the outer sealing collar or is configured one-piece with same.

Between the outer sealing collar and the inner sealing collar, at least one ring disk reinforcement is arranged featuring an outer circumferential ring area, from where several lobe-type tongues articulated to the ring area by means of their bases, arranged side-by-side in a circle, and configured approximately identical, extend radially inwards. These tongues taper starting from that area where they are articulated to the ring area, towards their free ends. The free ends of the tongues of this ring disk reinforcement are approximately located on a circle enclosing the opening for the insertion the water outlet. The ring disk reinforcement appropriately is a thin disk or small plate made of a plastic material. The connection area of the tongues to the ring area quasi constitutes a film hinge.

According to a further preferred embodiment, two ring disk reinforcements of that kind are present, that rest one upon the other and are arranged between the outer and the inner sealing collar. In this case, the two ring disk reinforcements are mutually twisted in such a manner that the edge line of the tongues of the first ring disk reinforcement comes to rest upon the center line of the tongues of the second ring disk reinforcement. Said ring disk reinforcements, for the remainder, are described in the initially mentioned publications.

The cross-sectional shape of the tongue thickened portions of the sliding funnel approximately corresponds to the cross-sectional shape of a dog's bone, with a broad torus-like protrusion pointing into the insertion direction, and a narrow torus-like protrusion pointing into the opposing direction. The supporting surface thereby is quasi supported by these two protrusions.

DESCRIPTION OF THE DRAWINGS

The inventive sealing unit will be explained hereafter in more detail by means of the Figures that illustrate a preferred embodiment. These Figures show.

DETAILED DESCRIPTION

Figure 1:
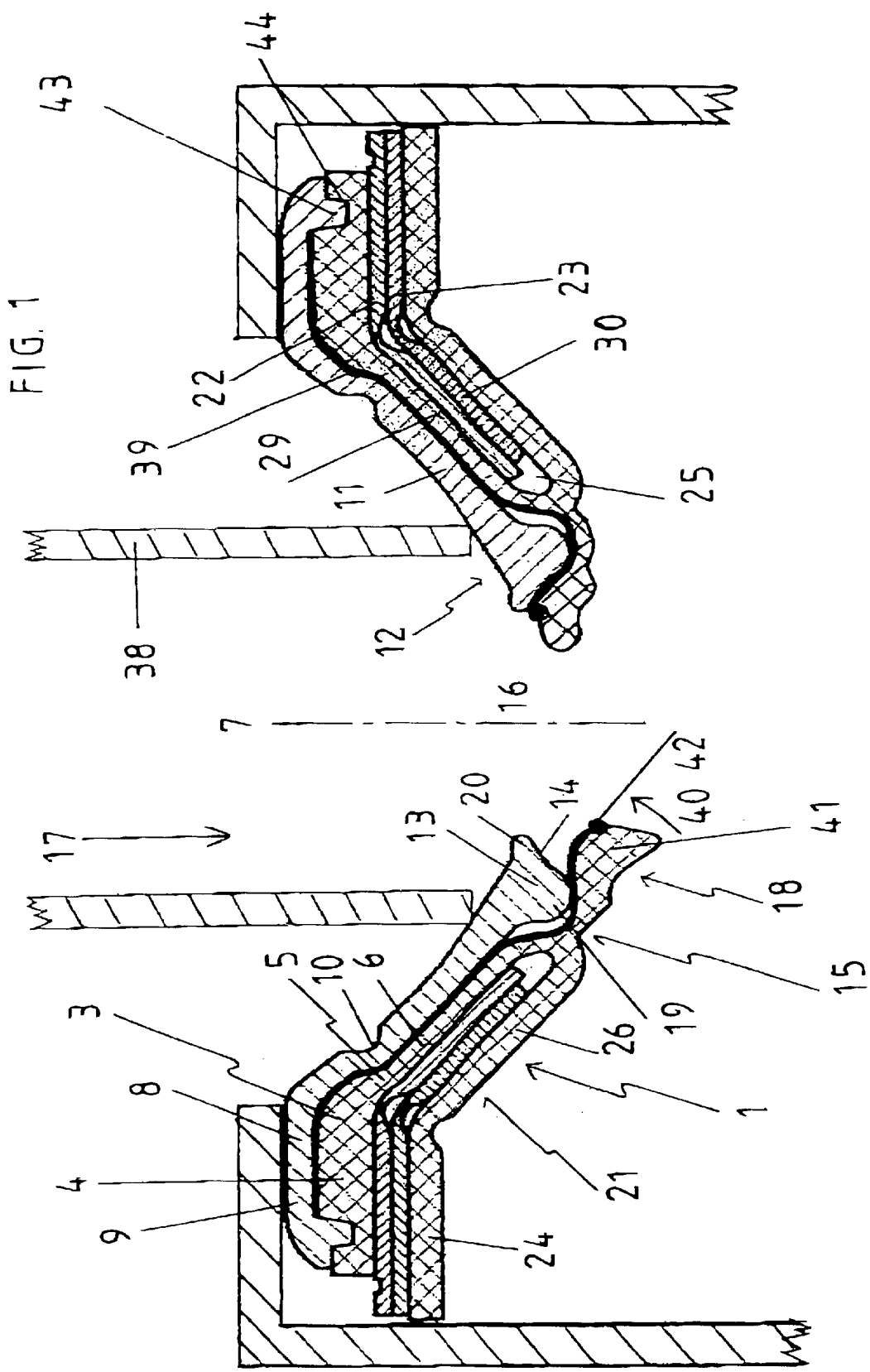
FIG. 1 a cut through an inventive sealing unit inserted into a pipe or such like, whereby the left side shows the sealing unit in the inoperative state, whereas the right side shows the situation with a water outlet inserted, FIG. 2 a top view and a sectional view of a first ring disk reinforcement, and FIG. 3 a top view and a sectional view of a second ring disk reinforcement.

The inventive sealing unit 1 shown in a sectional view in FIG. 1, has an outer sealing ring 3 consisting of an elastic material, e.g. rubber. The sealing ring 3 has an annular base body 4 that is configured approximately circular and is circumferential about the central axis 7. From the interior area 5 of said sealing ring 3, a sealing collar 6 extends towards the center or the central axis 7, which is moreover inclined angular to said central axis 7. The base body 4 thereby is configured one-piece with the outer sealing collar 6. Said sealing collar 6 likewise is entirely and continuously circumferential to the central axis 7.

The sealing collar 6 passes over radially inwards into a prolongation 18 that is quasi articulated to the sealing collar 6 in a connection area 15, which constitutes a kind of predetermined bending point.

At the exterior of the sealing ring 3, a sliding funnel 8 is arranged made up by a circumferential annular base body 9 that rests upon the exterior of the base body 4 of the sealing ring. From this base body 9, several tongues 11 extend radially inwards and hence towards the longitudinal axis 7, which tongues 11 are arranged side-by-side and only are articulated to the base body 9 by means of their bases 10, which forms a kind of film hinge. The tongues 11 therewith are not connected with each other and form a kind of expandable funnel. During expansion, the tongues 11 tilt about the base 10 in the direction of the insertion direction 17 (see arrow).

On their radially inner free edge, the tongues 11 have a thickened portion 13 with a broad torus-like protrusion 19 pointing inwards, and with a narrow outer protrusion 20. These protrusions 19 and 20 are configured torus-like; in other words, they have an approximately semicircular shape in the sectional view. The protrusion 20 thereby is mounted on the end in such a manner that it constitutes that part of the sliding funnel that comes closest to the central axis 7.

The sliding funnel 8 with its annular base body 9 and the tongues 11 thereby is comprised of a non-elastic material which has a maximum of sliding properties.

Between the protrusions 19 and 20, the supporting surface 14 is formed.

In the interior of the outer sealing collar 6, an inner sealing ring 21 is arranged essentially corresponding to the outer sealing ring 3 and running in parallel thereto. Thus, the inner sealing ring 21 likewise has a circumferential annular base body 24 and an inner sealing collar 26 following same towards the center. In the connection area between these two elements, the material of the inner sealing ring 21 is tapered, whereby a kind of predetermined bending point or film hinge is formed.

On its free edge pointing towards the center, the inner sealing collar 26 joins the outer sealing collar 6. Thereto follows the above-depicted connection area 15.

Between these two base bodies 4 and 24 and the two sealing collars 6 and 26, a kind of pocket 25 is formed, in which an outer ring disk reinforcement 22 and an inner ring disk reinforcement 23 abutting thereto are arranged. These two ring disk reinforcements 22 and 23, as well, each have a radially outer circumferential and continuous ring area 27 and 28 formed approximately U-shaped in the sectional view. From these ring areas 27 and 28 extend, distributed over the circumference, several tongues 29 and 30 configured approximately alike, which taper towards their free edge 31. These tongues 29 and 30 are approximately configured alike the tongues 11 of the sliding funnel 8. However, the material of the ring disk reinforcements 22 and 23 is thinner than the material of the sliding funnel 8.

At the base 32 of these tongues 29, 30, the material of these ring disk reinforcements is thinned, so that film hinges are thereby formed. Laterally of these thinned areas 52, recesses 33 are located which have the effect that the thinned areas or film hinges 32 are of a smoother action. These recesses 33 therewith are located at the radially outer end of the separation lines 34 of the tongues 29 and 30.

Figure 2:
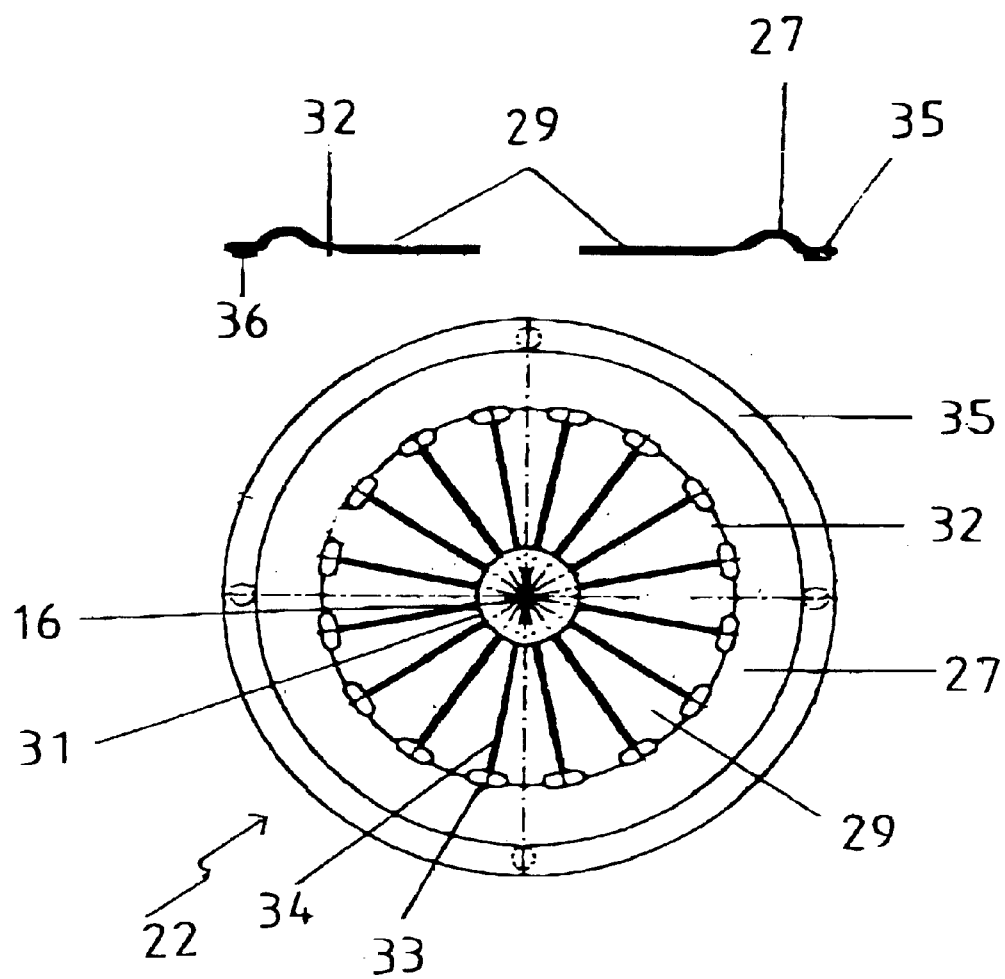
Figure 3:
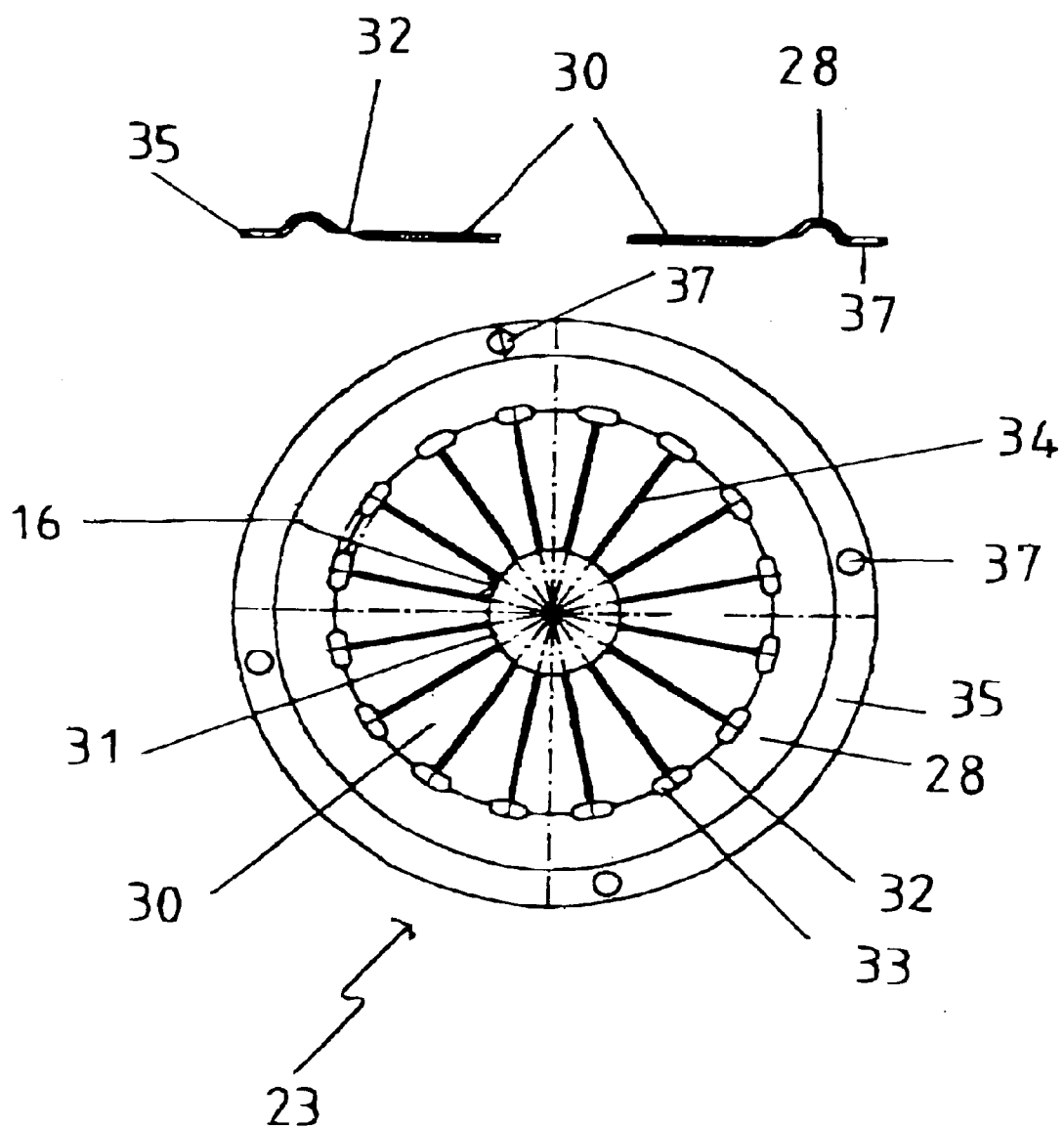

Radially outside from the ring area 27 and 28, respectively, the ring disk reinforcements 22 and 23 are provided with an edge 35 (cf. FIGS. 2 and 3). On the edge 35 of the ring disk reinforcements 22, several protrusions 36 are present, which protrude into corresponding recesses 37 of the ring disk reinforcement 23 when the two ring disk reinforcements 22, 23 are placed upon each other or are installed. These protrusions 36 and recesses 37 are arranged in such a manner that the ring disk reinforcements 22, 23 and the tongues 29, 30 thereof, respectively, are angularly staggered, so that the separation lines 34 of the outer ring disk reinforcement 22 come to rest approximately on the radial center line of the tongue 30 of the inner ring disk reinforcement 23.

The ring disk reinforcements 22 and 23 as compared to the material of the sealing rings 3 and 21, respectively, consist of a relatively non-elastic material, e.g. a plastic material such as PP, PE or PVC.

In the no-load condition of the ring disk reinforcements, the tongues 29, 30 approximately are arranged in the same plane as the ring areas 27, 28. In other words, the ring disk reinforcements 22, 23 in toto are configured disk-shaped or have the shape of a small plate. The angular bending of the tongues 29, 30 in the installed state is caused by the sealing rings 3, 21 and the sliding funnel 8, respectively. When the ring disk reinforcements 22, 23 are inserted into the pocket 25, then the tongues 29, 30 are pivoted about the base 32 into the insertion direction. Whereas the sliding funnel 8 has a priori the shape shown in FIG. 1.

During the insertion of the water outlet 38 only shown schematically in FIG. 1, same comes into abutment with its free edge against the tongues 11 of the sliding funnel 8. When the water outlet 38 is then pushed further into the insertion direction 17, then it will glide along the outer surface of the tongues 11; the tongues thereby will be expanded and pivoted away from the central axis 7 about the base 10.

During the further insertion of the water outlet 38, the outer protrusions 20 of the tongues 11 will then come into abutment against the outer envelope of the water outlet 38, and will glide along same. In other words, the water outlet 38 is in abutment with these protrusions 20 in the inserted condition. Since the protrusions 20 do not form a continuous ring (since the tongues are separated from each other), a discontinuous ring forms quasi around the water outlet 38. Due to the fact that several tongues 11 are distributed on the circumference, each tongue 11 individually can fit snuggly or adapt to the geometry of the water outlet. Thus, an optimal adaptation also to non-circular cross-sections is possible.

During the pivoting movement of the tongues 11 about the base or predetermined bending point 10, the tongues 11 expand the sealing collars 6, 26 and also the tongues 29, 30 of the ring disk reinforcements 22, 23. Thereby, the tongues 11 displace relative to the outer sealing collar 6. So as to facilitate said mutual displacement, the outer sealing collar 6 has on its outer surface, and hence on its side oriented towards the sliding funnel 8, a layer or a reinforcement coating 39 consisting of a silicone rubber, which layer or coating has a hardness (Shore hardness) higher than the rest of said sealing ring 3; this serves the purpose of improving the sliding action during the insertion in or the slipping onto a water outlet, e.g. a pipe.

During the insertion of the water outlet 38, the annular continuous and circumferential prolongation 18 further pivots about the connection area 15 into the direction of the arrow 40, and comes to rest upon the supporting surface 14 of the tongues 11. This latter condition is shown in the right half of FIG. 1. This condition, however, arises only then, when the water outlet 38 has been pushed in by a certain amount in the insertion direction 17, and the sliding funnel 8, as well as the sealing collars 6 and 26 have been expanded, whereby in this case said prolongation 18, too, comes to rest upon and into abutment against the area between the outer envelope of the water outlet 38 and the supporting surface 14; the latter condition, however, is not graphically illustrated.

In the condition of the water outlet being inserted, the prolongation 18 hence is present in the space that is extended by the outer envelope of the water outlet 38 and the supporting surface 14. Due to the prevailing fluid pressure which acts upon the prolongation 18 into the direction opposing the insertion direction 17, when the sealing unit is acted upon by a fluid pressure, e.g. water pressure, said prolongation 18 is pressed against the supporting surface 14 and the outer envelope of the water outlet 38. Conditioned by the fact that the supporting surface 14 has a certain extension in a plane perpendicular to the plane of the tongues and also perpendicular to the radial center line of the tongues 11, said supporting surface 14 can fulfill its function and serve as a counter-bearing. Would the tongues 11, for example, run out flat and acute, then there would be the risk of the prolongation 18 becoming bent around these free ends and being pushed out from the sealing area between the tongues and the water outlet.

The prolongation 18 moreover is configured on its free edge as a circumferential torus 41, the ring cross-section of which is approximately semicircular, the bulbed sides pointing radially outwards. Thereby, the mass available for the sealing action is increased.

During the pivoting away of the tongues 11, the broad torus-like protrusion 19 in the connection area 15 comes into abutment against the sealing collar 6 and the prolongation 18, respectively. Due to its semicircular shape, the prolongation 18 can come into snug contact with the sealing collar 6 and the prolongation 18 in the connection area 15; there are no sharp edges which could pierce or disturb the sealing collar or the prolongation. In addition, the bent prolongation 18 or the prolongation 18 pivoted away is supported by the supporting surface 14.

For improving the latter condition and the sealing effect, the prolongation 18 and the torus 41, respectively, have on their outer surface a circumferential O-ring-shaped thickened portion 42 likewise made of an elastic material, which, however, is harder than the material of the outer sealing collar or the prolongation 18. This material can be the same as the material of the layer 39 that reaches up to the O-ring-shaped thickened portion 42. During the expansion of the inventive sealing unit, the O-ring-shaped thickened portion approximately comes there in abutment against the supporting surface 14 where the outer protrusion 20 of the tongues 11 is located. In the no-load condition, said O-ring-shaped thickened portion is approximately in that zone of the torus 41, which is closest to the central axis 7. Due to this position, the O-ring-shaped thickened portion 42 facilitates the insertion of the water outlet and reduces thereby arising frictional forces.

In the pocket 25 between the inner and outer sealing collars 6 and 26, respectively, a sliding aid is present for lubricating the outer and inner ring disk reinforcements 22, as well as the sealing collars that are mutually displaced during the expansion of the sealing unit and the opening 16, respectively.

So as to bring the sliding funnel 8 into toothed engagement with the outer sealing ring 3, the annular base body 9 has a protrusion 43 pointing axially inwards and into the direction of the insertion direction 17, which protrusion 43 engages into an opposing U-shaped groove 44 of the annular base body of the sealing ring 3.

The inventive sealing unit can be inserted in a pipe or in an adapter coupling or in such like. An insertion possibility of this kind is outlined in FIG. 1 only in a schematic manner.

What is claimed is:

1. A sealing unit for sliding onto a water outlet (38) with formation of a fluid-tight connection with a water hose or similar that is equipped with said sealing unit (1), and that comprises at least one outer sealing ring (3) comprising an elastic material and having an annular base body (4), from the area (5) of which that is oriented towards the center, a circumferential outer sealing collar (6) extends towards the center, which collar is moreover inclined in the insertion direction (17) and encloses an opening (16) through which the water outlet (38) can be inserted, and a sliding funnel (8) comprising an annular circumferential base body (9) resting upon the exterior of the base body (4) of the sealing ring (3), and from which several lobe-type tongues (11) articulated to the base body (9) by means of their bases (10), extend radially inwards, which tongues rest upon the exterior of the outer sealing collar (6) and form a kind of funnel together, and the free ends of which enclose the opening (16) for the insertion of the water outlet (38), wherein the tongues (11), on their free ends (12) have a thickened portion (13) provided with a supporting surface (14), which is arranged approximately perpendicular to the plane of the respective tongue (11) and which is arranged approximately perpendicular to the radial longitudinal direction of the respective tongue (11), and the outer sealing collar (6) passes over radially inwards into a prolongation (18), which extends towards the center beyond the free ends of the tongues (11) of the sliding funnel (8), and which is configured on its free edge as a torus (41).

2. The sealing unit according to claim 1, wherein the ring cross-section of the torus (41) is approximately semicircular and is oriented axially outwards with its bulbed side.

3. The sealing unit according to claim 1, wherein the torus (41) has on its outer surface, approximately in that area that is closest to the center of the sealing unit (1) in the inoperative state, a circumferential O-ring-shaped thickened portion (42) likewise consisting of an elastic material, which, however, is harder than the material of the outer sealing ring (3).

4. The sealing unit according to claim 3, wherein the outer sealing collar (6), on its side oriented towards the sliding funnel (8), has a layer (39), which extends up to the O-ring-shaped thickened portion (42), and which consists of the same material as said O-ring-shaped thickened portion (42).

5. The sealing unit according to claim 1, wherein on that side of the outer sealing ring (3) opposing the sliding funnel (8), an inner, additional sealing ring (21) is present, which is configured approximately alike the outer sealing ring (3) and has an inner sealing collar (26) towards the center, which sealing collar (26) extends up to the connection area (15) where the outer sealing collar (6) passes over into the prolongation (18).

6. The sealing unit according to claim 5, wherein the inner sealing collar (26) in the connection area (15) is connected with the outer sealing collar (6) or is configured one-piece with same.

7. The sealing unit according to claim 5, wherein between the sealing collars (6, 26) at least one ring disk reinforcement (22, 23) is mounted comprising an outer circumferential ring area (27, 28), from which several lobe-type tongues (29, 30) articulated to the ring area (27, 28) by means of their bases and arranged side-by-side in a circle, extend radially inwards.

8. The sealing unit according to claim 1, wherein the cross-sectional shape of the thickened portion (13) of the tongues (11) of the sliding funnel (8) approximately corresponds to that of a dog's bone, with a broad torus-like protrusion pointing into the insertion direction (17), and a narrow torus-like protrusion (20) pointing into the opposing direction.

* * * * *